(12) United States Patent
Carter

(10) Patent No.: US 7,792,049 B2
(45) Date of Patent: Sep. 7, 2010

(54) TECHNIQUES FOR MODELING AND EVALUATING PROTOCOL INTERACTIONS

(75) Inventor: Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1056 days.

(21) Appl. No.: 11/290,341

(22) Filed: Nov. 30, 2005

(65) Prior Publication Data

US 2007/0121522 A1 May 31, 2007

(51) Int. Cl.
G01R 31/08 (2006.01)
(52) U.S. Cl. .................... 370/252; 370/465
(58) Field of Classification Search .............. 370/252, 370/401, 465, 466, 467, 469
See application file for complete search history.

(56) References Cited

U.S. PATENT DOCUMENTS

| 5,732,193 | A | 3/1998 | Aberson |
| 6,522,768 | B1 | 2/2003 | Dekhil et al. |
| 6,532,554 | B1 | 3/2003 | Kakadia |
| 6,614,348 | B2 | 9/2003 | Ciccolo et al. |
| 6,904,409 | B1 | 6/2005 | Lambert et al. |
| 7,047,243 | B2 * | 5/2006 | Cabrera et al. ............ 707/10 |
| 7,337,155 | B2 * | 2/2008 | Yoshida ................. 706/15 |
| 2003/0229603 | A1 | 12/2003 | Childress et al. |

* cited by examiner

Primary Examiner—Ricky Ngo
Assistant Examiner—Christine Ng
(74) Attorney, Agent, or Firm—Schwegman, Lundberg & Woessner, P.A.

(57) ABSTRACT

Techniques for modeling and evaluating protocol interactions are provided. A service is monitored for its interactions with one or more protocols. The protocols are semantically defined and reference behaviors are derived therefrom in response to the interactions. The reference behaviors are then compared to runtime activities observed for the service with respect to the one or more protocols. If the activities deviate beyond a threshold, then the activities are flagged as suspect or deviant behaviors for the service.

14 Claims, 3 Drawing Sheets

TECHNIQUES FOR MODELING AND EVALUATING PROTOCOL INTERACTIONS

FIELD

The invention relates generally to network security and more particularly to modeling and evaluating protocol interactions with services over a network.

BACKGROUND

As more and more commerce is conducted over the Internet, security concerns continue to grow because criminals are becoming more sophisticated and view the Internet as a rich environment for perpetrating their crimes. One of the main draws to electronic commerce is the ability to automate actions that have conventionally required human resources. However, automated services are more susceptible to being compromised by maleficent individuals who know how to deceive and use the automated services for their benefit.

A variety of software techniques and hardware devices are used by enterprises for detecting and thwarting deviant activity occurring with automated services. For example, encryption or keys may be used during communications with a service. Other techniques may require authentication to services before access is granted. In still other cases, specific hardware devices may utilize tokens or private keys to identify and authenticate themselves to the desired services.

Even with the most well thought out and conceived security environment, the environment may have security holes that can be found by savvy individuals who are familiar with the techniques being used within that environment. Consequently, enterprises are continually and regularly updating and augmenting their security techniques in an attempt to stay one step ahead of the opportunists that lurk about on the Internet.

Thus, security mechanisms should be adaptive and should be capable of anticipating new and unforeseen security situations. But, such security clairvoyance is difficult to establish because automated systems are typically hard coded and configured for known and previously encountered attacks and these systems are not geared to learn and anticipate new situations.

SUMMARY

In various embodiments, techniques for modeling and evaluating protocol interactions are presented. More specifically, and in an embodiment, a method for monitoring and evaluating a protocol's interaction with a network service is provided. A service is monitored for interactions with given network protocol and one or more behavior vectors for the service, with respect to the given protocol, are derived. Additional activity of the service for the given protocol is compared against the one or more behavior vectors and a determination is made as to whether the additional activity falls within a desired activity or behavioral threshold for the service.

DETAILED DESCRIPTION

Figure 1:
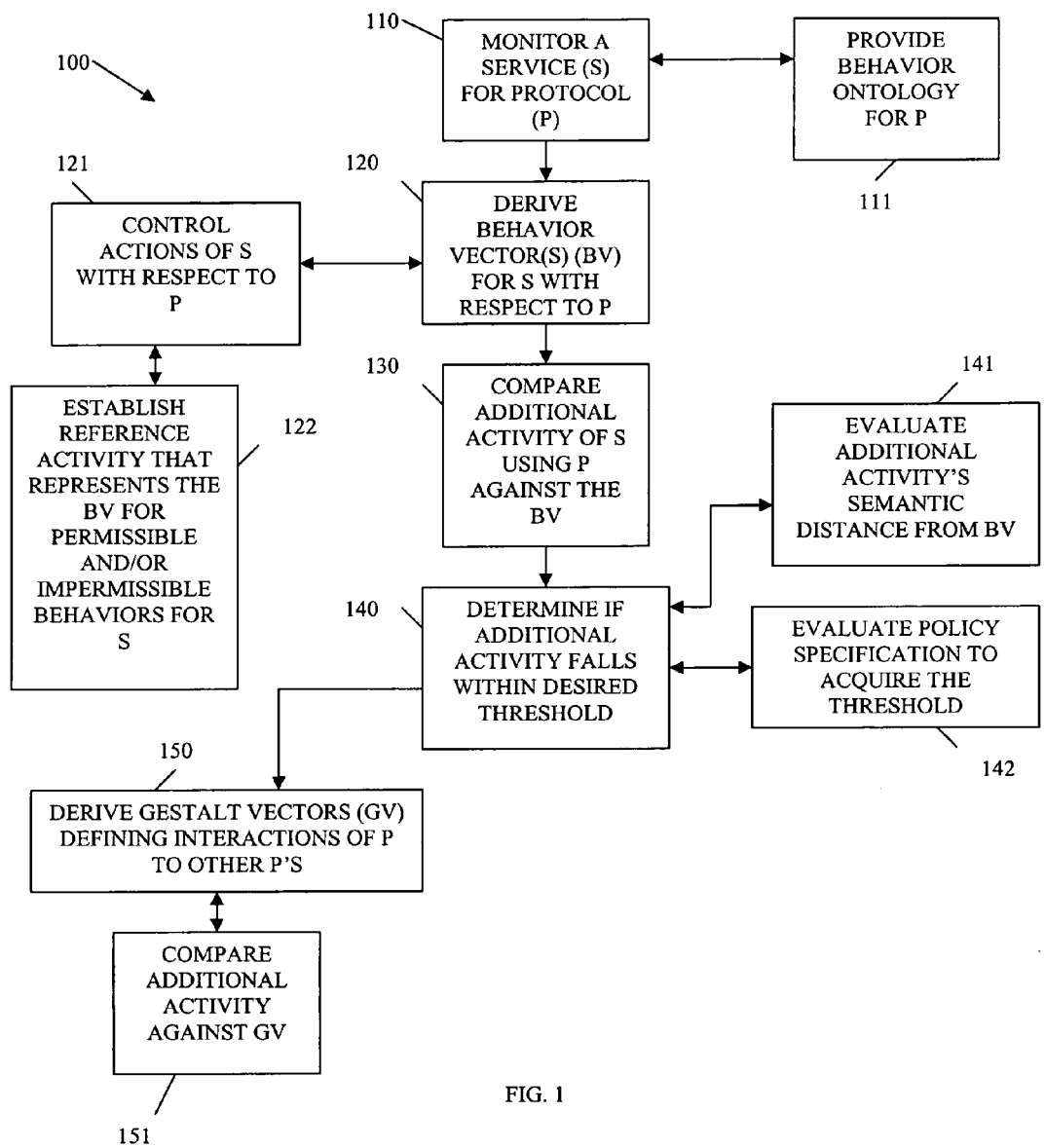
FIG. 1 is a diagram of a method for monitoring and evaluating a protocol's interaction with a network service, according to an example embodiment.

A "resource" includes a user, service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

A "protocol" is an agreed upon communication language used between two or more resources to communicate with one another. Protocols may be industry based, such as Transfer Control Protocol (TCP), or may be custom created. Furthermore, protocols may be secure, such as Hypertext Transfer Protocol (HTTP) over Secure Sockets Layer (HTTPS), or may be insecure, such as HTTP. Resources communicate with one another over a network using agreed upon protocols. Some protocols may be adapted to communicate with other disparate protocols.

A "protocol ontology" defines the behavior semantics of a given communication language, which is associated with a given protocol. The behavior semantics may be formally represented in a structured manner, such as by way of a schema definition. The semantics define the permissible commands, parameters, and interactions of parties using the communication language.

A "behavior" is an activity or action of a resource, which is taken within the context of a given protocol or set of protocols. For example, an Internet Control Message Protocol (ICMP) "ping" operation may be associated with a behavior that takes as an argument an Internet Protocol (IP) address (resource) or reference that resolves to an IP address and returns a value indicating whether the device associated with the IP address is operational or is not responding.

A "behavior vector" is a data structure that formally represents a set of behaviors that exists within a given protocol ontology. In most cases, the set of behaviors represents only a small subset of the available behaviors for the given protocol. The behavior vector may be automatically derived from a protocol ontology after observing actions of a service (resource) with respect to a given protocol over some period of time. The behavior vector may also be manually created by an administrator. Behavior vectors may be grouped into sets of related vectors and may be used to define permissible or impermissible behaviors for a service with respect to a given protocol.

As used herein, a "Gestalt behavior vector" is a special type of behavior vector that is used to define behaviors between two disparate protocols. For example, a Gestalt behavior vector may define a subset of interactions between a TCP protocol and an HTTP protocol. Gestalt behavior vectors may be organized hierarchically such that higher-level vectors define sets of behaviors for lower-level vectors, in this manner a Gestalt behavior vector may include references to other Gestalt behavior vectors. The Gestalt behavior vectors permit behavior vectors to be defined with respect to one another and in collections with one another.

The behaviors or behavior vectors may be logically mapped within a context or semantic space. That is, a defined universe, context, or semantic space for a given protocol may be represented logically as a collection bounded points. Any particular behavior or an entire behavior vector may be mapped to a point within the collection of bounded points. Any two points may be arithmetically or logically compared by computing the distance between those two points. Such an arrangement provides for the context of establishing a semantic distance between behaviors for a given protocol or given set of protocols.

Examples of establishing semantic space, resolving semantic distances, and establishing semantic vectors or abstracts may be found in U.S. Ser. No. 09/615,726, entitled "A Method and Mechanism for the Creation, Maintenance and Comparison of Semantic Abstracts," filed on Jul. 13, 2000; U.S. Ser. No. 09/512,963, entitled "Construction, Manipulation, and Comparison of a Multi-Dimensional Semantic Space," filed on Feb. 25, 2000; U.S. Ser. No. 09/691,629, entitled "Method and Mechanism for Superpositioning State Vectors in a Semantic Abstract, filed on Oct. 18, 2000; and U.S. Pat. No. 6,108,619, entitled "Method and Apparatus for Semantic Characterization of General Content Streams and Repositories," issued on Aug. 22, 2000. The disclosures of which are incorporated by reference herein.

Various embodiments of this invention can be implemented in existing network architectures. For example, in some embodiments, the techniques presented herein are implemented in whole or in part in the Novell® network and proxy server products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a diagram of a method 100 for monitoring and evaluating a protocol's interaction with a network service, according to an example embodiment. The method 100 (hereinafter "behavior detection service") is implemented in a machine-accessible and readable medium. The behavior detection service is operational over and processes within a network. The network may be wired, wireless, or a combination of wired and wireless.

In an embodiment, the behavior detection service is implemented within a network service. Thus, the behavior detection service models, monitors, and evaluates behaviors of the network service with which it is embedded or interfaced to. In other embodiments, the behavior detection service is implemented as a proxy that interacts with the network service as the network service communicates with resources over a network. The proxy may be a transparent proxy, such that the network service is unaware of the proxy's existence. Alternatively, the proxy may be a forward proxy, such that the network service is configured to directly interact with the network service. In still other cases, the proxy may be a reverse proxy.

At 110, the behavior detection service monitors a network service for interactions over the network for a given protocol. The behavior detection service may sniff a network connection of the service to detect activity. Moreover, the format of that activity or the port over which the activity is occurring may reveal the type of protocol being monitored. Again, the behavior detection service may be known or unknown to the service that it is designed to monitor.

In some cases, at 111, the behavior detection service may have previously built or provided a behavior ontology for the given protocol being monitored. The behavior ontology defines the behavior semantics of the protocol and its interactions. One technique for doing this is to parse or generate a grammar that defines the semantics of the protocol; the grammar may include commands and parameter types associated with those commands. Moreover, the behavior ontology for the protocol may be logically viewed as the semantic space within which the protocol operates. That is, the ontology provides the semantics for using the protocol.

At 120, the behavior detection service derives one or more behavior vectors for the network service with respect to the protocol being monitored. The behavior vectors are derived by recording actions or activities of the network service over some period of time. The actions or activities (behaviors) may be uniquely represented within the behavior vectors so as to not repeat and may be ordered or ranked within the vectors. In some cases, the behaviors of the vectors may be weighted. So, a more frequently used protocol action (behavior) may be more heavily weighted within a behavior vector.

According to an embodiment, at 121, the behavior detection service may derive the behavior vectors within a control or test environment. So, the network service may be fed a specific set of test operations and the behaviors noted within the behavior vectors. In some cases, at 122, the behavior vectors established in this manner may be viewed as reference behavior vectors or activities that may identify permissible, impermissible, and/or known suspect behaviors for the service.

At 130, the behavior detection service subsequently waits and acquires additional activity of the network service, this additional activity is then compared against the one or more derived behavior vectors.

At 140, the behavior detection service uses the comparison to determine if the additional activity falls within a desired threshold. If the comparison is favorable then the additional activity may be deemed permissible. If the comparison is unfavorable then the additional activity may be deemed as impermissible. In some cases, the comparison may be more of a fuzzy match, such that suspect activity may be determined when the comparison is made to the threshold.

According to an embodiment, at 141, the behavior detection service may evaluate the additional activity by mapping it to a point in semantic space that defines the behavior ontology of the protocol. This point may then be compared to one or more points that the behavior vectors map to within the same semantic space. The distance between the points identity a semantic distance and the semantic distance may be compared to the desired threshold and depending upon a desired tolerance the additional activity may be classified as permissible, impermissible, or suspect.

In an embodiment, at 142, the behavior detection service may evaluate a policy or policy specification to acquire the desired threshold. So, a given protocol and/or network service may be associated with a policy specification and when the policy or policies of that policy are evaluated, the behavior detection service determines the desired threshold to use at 140.

In some cases, at 150, the behavior detection service may also group the behavior vectors into supersets with one another that cross protocol boundaries to derive Gestalt behavior vectors. The Gestalt vectors define interactions of the given protocol with respect to other protocols. At 151, the additional activity may also be compared against the Gestalt vectors and used to further determine if the additional activity is permissible, impermissible, and/or suspect.

It is now understood how the activities of a network protocol may be used to define behavior vectors based on observed behavior of a network service that uses the protocol and based on the protocol's behavioral ontology. These base lined vectors may then be used to compare subsequent activity of the network service with respect to the protocol and the comparison enables the behavior detection service to detect new and potentially detrimental activity. Thus, the behavior detection service is a dynamic and real-time adapted security mechanism capable of handling situations that have not been anticipated or previously planned for. This is done by modeling protocol behavior and then dynamically evaluating activities or behaviors with respect to the reference behaviors.

Figure 2:
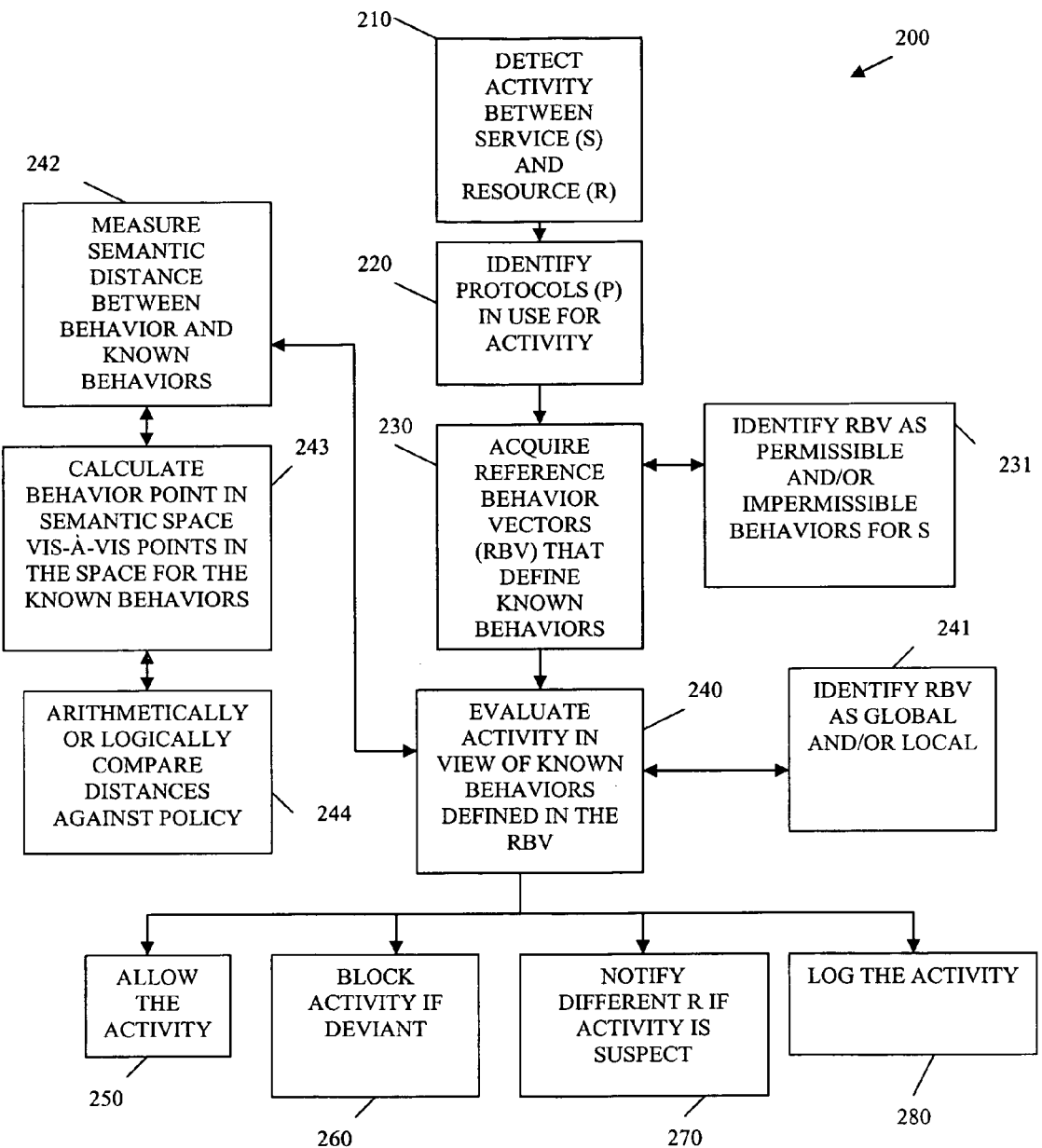
FIG. 2 is a diagram of another method for monitoring and evaluating a protocol's interaction with a network service, according to an example embodiment.

FIG. 2 is a diagram of another method 200 for monitoring and evaluating a protocol's interaction with a network service, according to an example embodiment. The method 200 (hereinafter "network activity detection service" is implemented in a machine-accessible and readable medium and is operational over a network. The network may be wired, wireless, or a combination of wired and wireless. In an embodiment, the network activity detection service presents an alternative view of the behavior detection service represented by the method 100 of the FIG. 1.

The network activity detection service may be known to the service that it monitors or may be unknown to that service. Thus, the network activity detection service may sniff or intercept network activity of a particular service or it may be presented with proposed activity by the particular service for evaluation.

At 210, the network activity detection service detects activity occurring between a network service and a resource. The resource may itself be another external service. By external it is meant the resource is outside the local environment of the network service, and the resource and the network service use one or more protocols to communicate with one another over a network.

At 220, the network activity detection service identifies one or more protocols that are being used with the detected activity between the network service and the resource. Again, this may be achieved by inspecting packets or by virtue of a specific communication channel or port being used for communication between the network service and the resource.

Once activity is detected and the protocols being used with the activity are resolved, at 230, the network activity detection service acquires one or more reference behavior vectors that define known activities (behaviors) for the protocols. According to an embodiment, at 231, the network activity detection service may identity some of the reference vectors as defined and known permissible activities and/or the network activity detection service may identify some of the reference vectors as defined and known impermissible activities. Thus, the reference vectors may be used to define acceptable and expected behaviors with protocols and to define unacceptable and yet known behaviors. So, as more and more unacceptable behaviors become known, these behaviors may be embodied within reference vectors such that the network activity detection service learns and improves its knowledge of deviant behaviors.

At 240, the network activity detection service evaluates the detected activity in response to the known activities defined within the reference behavior vectors. According to an embodiment, at 241, the reference vectors may be integrated with one another so as to define behaviors across multiple disparate protocols that interface with one another or across collections of protocols that interact with one another. Thus, the reference vectors may be viewed as global vectors or as local vectors. Examples of such vectors were provided above with respect to the discussion of the method 100 of the FIG. 1 and were also defined above as Gestalt behavior vectors, such examples and definitions are incorporated by reference herein with the discussion of the FIG. 2.

According to an embodiment, at 242, the activity that was detected, at 210, may be evaluated in view of the acquired reference behavior vectors, at 230, by measuring the semantic distance between the detected activity and the known activities of the reference vectors.

At 243, this may be achieved by calculating an activity point within semantic space for the detected activity and then calculating or acquiring one or more points associated with the known activities of the reference vectors or with the reference vectors as a whole within the same semantic space.

Once the points are known, at 243, arithmetic or logical compares may be used to compute the distances between the activity point within the semantic space and the other reference vector points. The set of distances or single distance that results may then be compared to a policy or a threshold acquired from a policy to determine whether the detected activity is permissible, impermissible, or even suspect.

The network activity detection service may perform a variety of processing in response to configurations or policies after the evaluation is performed. For example, at 250, if the evaluation is favorable then the network activity detection service may permit the activity to continue unabated. Alternatively, at 260, if the evaluation is unfavorable, then the network activity detection service may block the activity and identify it as deviant behavior. In some cases, at 270, the network activity detection service may notify an entirely different resource or principal if the detected activity is evaluated as being suspect. In yet more situations, at 280, the network activity detection service may log the activity to one or more storage or memory locations for future reporting or auditing.

The network activity detection service establishes sets or collections of reference behavior vectors. These reference vectors may be acquired over a period of time and may evolve over the lifespan of the network service and protocols to which they relate. The reference vectors may be weighted, scored, and/or mapped to semantic space associated with a given protocol or given collection of protocols. When an activity is detected over the network for the network service, that activity may likewise be weighted, scored, and/or mapped to the appropriate semantic space, such that semantic logic and arithmetic may be performed against the activity vis-à-vis the reference vectors or the individual behaviors of the reference vectors.

The result of that evaluation may then be resolved according to policies or thresholds and the network activity detection service may take no action or some affirmative action with respect to the detected activity. This technique is adaptive and permits comparisons of previously unknown and undetected activity to be evaluated in a systematic and reliable manner for purposes of identifying network security threats. Once a threat is known, the threat may be represented in one or more reference vectors and used to continually and dynamically educate the network activity detection service.

In some embodiments, the methods 100 and 200 are implemented as instructions on machine-readable medium. The instructions when accessed by a machine perform the processing described above with respect to the FIGS. 1 and 2. The medium may be removable and interfaced to the machine, may be integrated and prefabricated within the machine as memory and/or storage, and/or may be associated with a mass storage device over a network and downloaded to the machine. Moreover, the instructions need not reside contiguously within the medium and need not reside within the same medium. That is, the instructions may be logically assembled from a variety of media and processed by the machine. In some cases, the instructions may be remotely processed over a network on one machine at the direction of another machine.

Figure 3:
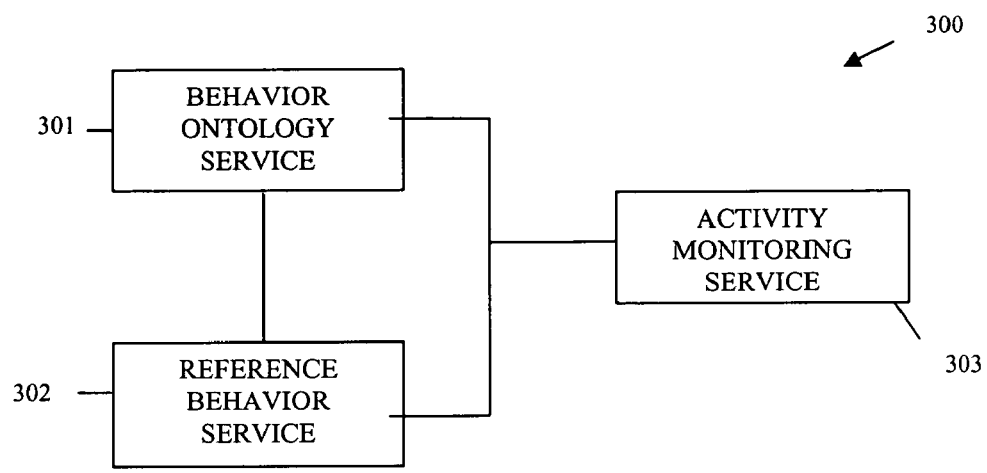
FIG. 3 is a diagram of a protocol modeling and evaluation system, according to an example embodiment.

FIG. 3 is a diagram of a protocol modeling and evaluation system 300, according to an example embodiment. The protocol modeling and evaluation system 300 is implemented in a machine-accessible and readable medium and is operational over a network. The network may be wired, wireless, or a combination of wired and wireless. In an embodiment, the protocol modeling and evaluation system 300 implements, among other things, the behavior detection service and the network activity detection service represented by the methods 100 and 200 of the FIGS. 1 and 2, respectively.

The protocol modeling and evaluation system 300 includes a behavior ontology service 301, a reference behavior service 302, and an activity monitoring service 303. Each of these will now be discussed in turn.

The behavior ontology service 301 is designed to extract a protocol behavior ontology for a given protocol. That is, a protocol's semantic behavior and use may be formally represented within a data structure, such as a schema or grammar. The schema or grammar defines the semantic behavior of the protocol. Essentially, a protocol's ontology defines a semantic space or universe for a given protocol in a formal or logical manner that is represented in a data structure and that may be evaluated and processed by instructions of a machine.

The behavior ontology service 301 may evaluate a protocol and its uses within one or more environments for one or more services to derive the ontology of that protocol. In some cases, the behavior ontology service 301 may uses schemas or language definitions for a given protocol to derive its ontology. The ontology produced by the behavior ontology service 301 is consumed by or acquired by the reference behavior service 302 and/or the activity monitoring service 303.

Essentially, the behavior ontology service 301 builds semantic definitions for behaviors of protocols that define the semantic space of those protocols.

The reference behavior vector service 302 derives reference behaviors for the given protocol as it relates to interactions of a given service with one or more resources over a network. The reference behavior vectors are subsets of a given protocol's ontology produced by the behavior ontology service 301. So, during actual use any given service may only use or exhibit a small subset of behaviors for a given protocol. This usage and perhaps metrics or dependencies associated with that usage may also be represented within reference behavior vectors. For example, the frequency of a particular behavior for a given resource may be weighted or communicated within a reference vector. As another example, a dependency between to behaviors, such as a second behavior always follows a first behavior, may be communicated within a reference vector.

The reference behavior vector service 302 may derive the reference vectors within controlled or test environments associated with a given service. Thus, specific behaviors may be observed when the service is directed to take certain actions within a test. Some actions may be permissible and others may be impermissible and done for purposes of testing.

Moreover, during the lifecycle of the protocol modeling and evaluation system 300, the reference behavior vector service 302 may continually learn and establish new and/or modified reference behavior vectors in response to runtime and dynamic operations of any given service.

Additionally, the reference and behavior vector service 302 may aggregate reference behavior vectors to establish cross protocol behavior vectors and/or to establish hierarchical and global sets of protocol behavior vectors. Thus, the reference behavior vectors may be globally associated with sets of protocols or locally associated with a particular or specific protocol.

The activity monitoring service 303 monitors network activity for a given network service with respect to one or more protocols or collections of protocols. The detected activity may then be semantically mapped or logically represented within a semantic space for the given protocol or given collection or protocols. Once mapped, the activity and monitoring service may compare it against the reference vectors or known behaviors within any given reference vector based on mappings of the reference vectors or behaviors to the same semantic space. A semantic distance may then be calculated between the detected activity and the reference vectors or reference behaviors. Policy or threshold evaluation may then yield a determination as to whether the detected activity is permissible, impermissible, or suspect.

In some cases, the activity monitoring service 303 may take evasive action against network activity that is determined to be deviant. This may entail notifying other resources of the origin of the suspect activity and its believed problem and/or may entail blocking the activity within the environment of the network service. Additionally, the activity monitoring service 303 may log activities, report activities, audit activities, and/or permit activities to proceed unabated within the environment of the network service.

The protocol modeling and evaluation system 300 is a dynamic learning and adaptive security mechanism, which can identify never before encountered security threats and take evasive action in an autonomous and automated fashion.

Figure 4:
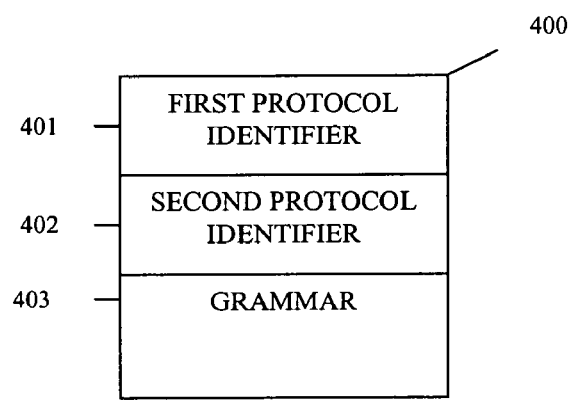
FIG. 4 is a diagram of a data structure implemented in a machine-accessible medium that models interactions between protocols, according to an example embodiment.

FIG. 4 is a diagram of a data structure 400 implemented in a machine-accessible medium that models interactions between protocols, according to an example embodiment. The data structure 400 is implemented in a machine-accessible and readable medium and is accessed and processed over a network. The network may be wired, wireless, or a combination of wired and wireless.

According to an embodiment, the data structure is built, managed, and consumed as an aggregation of behavior vectors from a behavior detection service and/or a network detection service represented by the methods 100 and 200 of the FIGS. 1 and 2. Moreover, the reference behavior service 302 and the activity monitoring service 303 of the protocol modeling and evaluation system 300 of the FIG. 3 may build, manage, and consume the data structure 400 represented by the diagram of FIG. 4. It is understood, the data structure 400 is presented in the FIG. 4 for purposes of illustration only, as other components may be added to the data structure 400 and the data structure 400 may be architecturally arranged in different manners without departing from the teachings presented herein.

The data structure 400 includes a first protocol identifier 401, a second protocol identifier 402, and a grammar or schema 403. Each of these will now be discussed in turn.

The first protocol identifier 401 is associated with a first protocol and is used to uniquely identify the first protocol to the exclusion of other available protocols. Likewise, the second protocol identifier 402 is associated with uniquely referencing a second protocol that is different from the first protocol. Two protocols are different if they are associated with entirely different communication languages, such as TCP and HTTP, or the two protocols may be deemed different from one another if associated with a different version of the same protocol.

In some embodiments, the first protocol identifier 401 and/or the second protocol identifier 402 may be associated with a collection or protocols. That is, the data structure 400 may be viewed as a Gestalt behavior vector, as described above with respect to the methods 100, 200, and the system 300 of FIGS. 1-3, respectively.

The grammar 403 defines the interactions between the first protocol and the second protocol within the data structure 400. The grammar 400 may be assembled or derived by a reference behavior service 302, represented in the system 300 of the FIG. 3. The reference behavior service 302 observes inter-protocol activities for a given network service and from that establishes or builds the grammar 403 defining that behavior relationship and interaction.

The grammar 403 may be implemented and viewed as a data structure, a schema, and/or as a grammar.

In an embodiment, the reference behavior service 302 may use a first semantic definition associated with the first protocol and a second semantic definition associated with the second protocol to build the grammar 403. Each semantic definition may be initially established by a behavior ontology service 301 as a protocol ontology, as described above with the system 300 of the FIG. 3.

The grammar 403 may include a variety of information and may logically represent a variety of information with respect to behaviors associated with interactions between the first and second protocols. For example, the grammar 403 may be associated with known deviant behavior. Alternatively, the grammar 403 may be associated with a subset of permissible behaviors.

As another example, the grammar 403 may include commands associated with inter communications between the first and second protocols. The commands may further include parameter semantics.

The grammar 403 may also contain metadata, such as dynamically assembled metrics associated with certain identified behaviors. Moreover, the metadata may be ordered in terms of its relevancy. According to an embodiment, the metadata associated with grammar 403 includes values for points within a semantic space for the entire set of behaviors included within the grammar 403 or for individual behaviors included within the grammar 403. In this manner, the semantic arithmetic may be more easily processed when an activity of a service is detected, since the data structure 400 may optionally carry its semantic location or score as metadata associated with the grammar 403. This may improve processing throughput and may help compare detected activity of a service more quickly against the data structure 400 in view of a policy or threshold.

The data structure 400 may be logically viewed as a vector that aggregates other behavior vectors. The aggregation spans multiple protocols and permits behaviors to be referenced or base lined for inter protocol communications. It should also be pointed out that the data structure 400 may be recursively defined on top of other instances of the data structure. So, the first or second protocol identifiers 401 or 402 may be a reference to another instance of the data structure 400. This permits hierarchical behavior vectors to be defined when evaluating protocol usages for a given service.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory machine-readable medium and to execute on a proxy, the method comprising:

monitoring, by the proxy, a service for interactions with given network protocol;

deriving, by the proxy, one or more behavior vectors for the service with respect to the given protocol;

comparing, by the proxy, additional activity of the service for the given protocol against the one or more behavior vectors; and determining, by the proxy, whether the additional activity falls within a desired threshold for the service, the one or more behavior vectors represents a sub set of behaviors or actions that exist for a given network protocol ontology assigned to the given network protocol, the given network protocol ontology defines behavior semantics of a given communication language that is the given network protocol, the behavior semantics define a sub set of permissible commands, parameters, and interactions of parties using the given communication language, the one or more behavior vectors are automatically derived from the given network protocol ontology after observing actions of the parties with respect to the given network protocol over a period of time, the given network protocol ontology defines a semantic space or universe for the given network protocol in a formal manner, each behavior vector is mapped to a point in the semantic space and the additional activity is also mapped to another point in the semantic space, any two points in the semantic space are subtracted to obtain a semantic distance that is compared to the desired threshold to determine when the additional activity is permissible, impermissible, and suspect.

2. The method of claim 1, wherein deriving further includes controlling actions or an environment of the service with respect to the given protocol while deriving the one or more behavior vectors.

3. The method of claim 2, wherein deriving further includes establishing reference activity for the service and the given protocol with the one or more behavior vectors, wherein a number of the behavior vectors define permissible behavior for the service and other of the behavior vectors define impermissible behavior for the service.

4. The method of claim 1 further comprising, deriving, by the proxy, one or more gestalt behavior vectors that define interactions of the service for the given protocol with one or more additional protocols.

5. The method of claim 4 further comprising, comparing, by the proxy, the additional activity of the service for the given protocol and the one or more additional protocols against the one or more gestalt behavior vectors.

6. The method of claim 1, wherein determining further includes evaluating a policy specification in view of the additional activity and activities represented in the one or more behavior vectors to acquire the desired threshold.

7. A method implemented in a non-transitory machine-readable medium and to execute on a proxy, the method comprising:

detecting, by the proxy, activity between a service and a resource over a network;

identifying, by the proxy, one or more protocols in use for the activity;

acquiring, by the proxy, one or more reference behavior vectors that define known permissible and impermissible activities for the one or more protocols; and evaluating, by the proxy, the activity in view of the known permissible and impermissible activities defined in the one or more reference behavior vectors, the one or more reference behavior vectors represents a sub set of behaviors or the known permissible and impermissible activities that exist for a given network protocol ontology assigned to a given network protocol, the given network protocol ontology defines behavior semantics of a given communication language that is the given network protocol, the behavior semantics define permissible and impermissible commands, parameters, and interactions of service and the resource using the given communication language, the one or more reference behavior vectors are automatically derived from the given network protocol ontology after observing actions of parties with respect to the given network protocol over a period of time, the given network protocol ontology defines a semantic space or universe for the given network protocol in a formal manner, each behavior vector is mapped to a point in the semantic space and the activity is also mapped to another point in the semantic space, any two points in the semantic space are subtracted to obtain a semantic distance that is compared to a desired threshold to determine when the activity is permissible, impermissible, and suspect.

8. The method of claim 7 further comprising at least one of:

allowing, by the proxy, the activity;

blocking, by the proxy, the activity if the evaluation identifies deviant behavior;

notifying, by the proxy, a different resource if the evaluation identifies the activity as suspect behavior; and logging, by the proxy, the activity.

9. The method of claim 7, wherein acquiring further includes identifying a number of the reference behavior vectors as global vectors defining subsets of interactions between various ones of the one or more protocols and identifying other ones of the reference behavior vectors as local vectors defining specific ones of the one or more protocols.

10. The method of claim 7, wherein acquiring further includes identifying a number of the reference behavior vectors as permissible behavior for the service and identifying others of the reference behavior vectors as known impermissible behavior for the service.

11. A system, comprising:

a behavior ontology service implemented in a machine-readable medium and to execute on a proxy;

a reference behavior vector service implemented in a machine-readable medium and to execute on the proxy; and an activity monitoring service implemented in a machine-readable medium and to execute on the proxy, the behavior ontology service is to build semantic definitions of protocols that define permissible and impermissible commands, parameters, and interactions of a service and a resource using communication languages that are the protocols, and the reference behavior vector service is to automatically derive reference behavior vectors in response to observed activities between the service and the resource over a network and in response to the semantic definitions, and the activity monitoring service is evaluate runtime activities between the service and the resource over the network in view of the reference behavior vectors to selective allow and deny the interactions between the service and the resource, the semantic definitions for the protocols define a semantic space or universe for the protocols in a formal manner, each reference behavior vector is mapped to a point in the semantic space and the observed activities are also mapped to other points in the semantic space, any two points in the semantic space are subtracted to obtain a semantic distance that is compared to a desired threshold to determine when the observed activities are permissible, impermissible, and suspect.

12. The system of claim 11, wherein the behavior ontology service is to build the semantic definitions in response to observing activities of at least one of the service and the protocols to which the semantic definitions relate.

13. The system of claim 11, wherein the reference behavior vector service is to derive the reference behavior vectors by monitoring controlled interactions between the service and the resource.

14. The system of claim 11, wherein the reference behavior vector service is to derive a number of the reference behavior vectors as permissible behaviors for the service and others of the reference behavior vectors as impermissible behaviors for the service.

* * * * *